United States Patent

[11] 3,566,024

[72] Inventor Raymond Matchell
Essex, England
[21] Appl. No. 783,790
[22] Filed Dec. 16, 1968
[45] Patented Feb. 23, 1971
[73] Assignee The Marconi Company Limited
London, England
[32] Priority Feb. 26, 1968
[33] Great Britain
[31] 9209/68

[54] BANDWIDTH REDUCTION FOR VIDEO SIGNALS OF LOW LUMINANCE
9 Claims, 3 Drawing Figs.

[52] U.S. Cl. .......... 178/7.1, 178/6, 179/15.55, 325/475
[51] Int. Cl. .......... H04n 7/12, H04b 1/66
[50] Field of Search .......... 325/427, 474, 475; 178/6 (VBW); 333/70 (T); 328/165; 179/15.55

[56] References Cited
UNITED STATES PATENTS
3,352,969 11/1967 Konings .......... 178/6VBW
2,816,267 12/1957 Jager et al. .......... 325/38.1

*Primary Examiner*—Robert L. Griffin
*Assistant Examiner*—Donald E. Stout
*Attorney*—Baldwin, Wight & Brown

ABSTRACT: A circuit for receiving video signals from a television camera tube is described. The circuit includes a delay line which is reflective at one end and terminates in its characteristic impedance at its other end so as to be nonreflective. Video signals, derived from the television camera tube, are applied to the one end of the delay line through a diode biassed signal-level-dependent circuit adapted to differentiate against high level signals, and video signals are also applied to the other end of the delay line through a similar diode biassed circuit adapted to differentiate against low level signals. Means are provided for taking off output video signals from the end of the line which is terminated in the characteristic impedance of the line. The bandwidth for video signals corresponding to low luminance areas of a subject of transmission is reduced compared to the bandwidth for video signals corresponding to higher luminance areas.

PATENTED FEB 23 1971 3,566,024

INVENTOR
Raymond Matchell
BY
Baldwin Wight Diller & Brown
ATTORNEYS

BANDWIDTH REDUCTION FOR VIDEO SIGNALS OF LOW LUMINANCE

This invention relates to television cameras.

As is well known normally available television picture reproducing tubes have markedly nonlinear characteristics and it is usual practice, therefore, to provide contrast law correction in a television camera in order to provide compensating correction for such nonlinearity. The contrast law correction increases the small signal gain in regions of low signal level ("blacks") with respect to that in regions of high signal level ("whites"). A ratio of gain of 8 : 1 from black to white is common. Such contrast correction has, however, the defect that it causes an undesirable increase of "noise" in the black region and it is common practice therefore, to overcome or reduce this defect by the expedient of providing means controlled by the level of the video signals, for varying the bandwidth of a channel interposed in the path of said signals so as to reduce the bandwidth for video signals corresponding to low luminance areas of a subject of transmission as compared to that for video signals corresponding to higher luminance signals. Although the adoption of this expedient involves reduction of bandwidth, this, and the loss of resolution which accompanies it, are not seriously objectionable, because owing to the reduced acuity of human vision for low luminance areas of a picture the theoretical loss of resolution which accompanies the adoption of the expedient in question is much outweighed from the practical point of view by the reduction of "noise" in low luminance areas.

The present invention seeks to provide improved and simple means for varying the bandwidth of a video signal channel under the control of the video signal level so as to reduce the bandwidth for video signals corresponding to low luminance areas of a subject of transmission as compared to the bandwidth video signals corresponding to higher luminance areas.

According to this invention video signals derived from a television camera tube are applied to one end of a delay line which is reflecting at one end and terminated to be nonreflecting at the other, through signal-level-dependent means adapted to differentiate against high level signals and video signals are also applied to the nonreflecting end of the line through signal-level-dependent means adapted to differentiate against low level signals, output signals being taken from the line.

The invention has the important practical advantage (in addition to that of simplicity) that the required differentiation between signals of different levels is obtained without introducing to any appreciable extent, undesirable frequency-dependent phase shifts, so that the expensive additional phase-correcting circuitry usually necessary in known comparable arrangements are not required.

One embodiment of the invention comprises a delay line which is reflective at one end and terminated by an impedance equal to its characteristic impedance at the other; a first transistor by means of which video signals are applied to the reflective end of the line and to which video signals are applied through a circuit including a resistance shunted by a diode sensed and biassed to cut off low signal levels; a second transistor by means of which video signals are applied to the characteristic impedance terminated end of the line and to which video signals are applied through a circuit including a resistance in series with a diode sensed and biassed to cut off high signal levels; and means for taking off output video signals from the characteristic impedance-terminated end of the line.

The invention is illustrated in and further explained in connection with the accompanying drawings in which.

Figure 1:
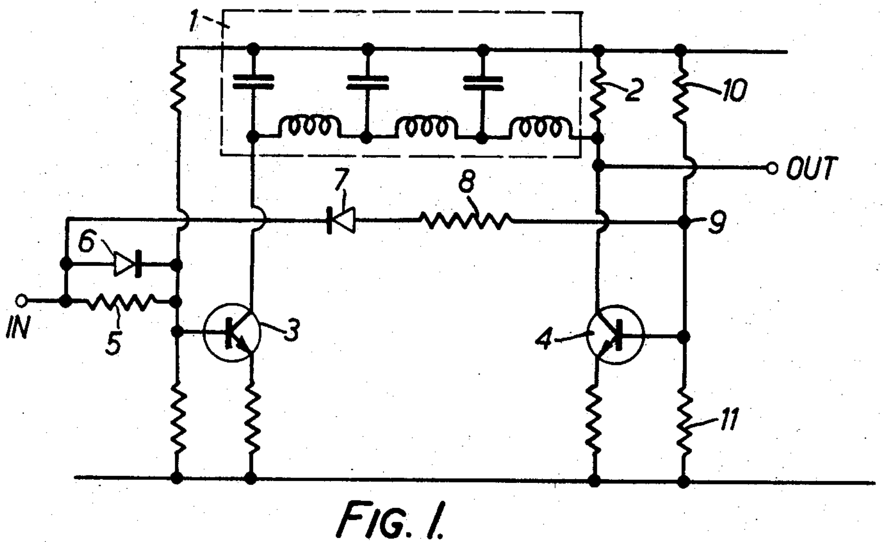
FIG. 1 is a diagram of a preferred embodiment.

Referring to FIG. 1 a delay line, comprising series inductors and shunt capacitors, is terminated at one end by a resistance 2 equal to its characteristic impedance. There are two transistors 3 and 4 which are as nearly as possible alike and of the same gain. Video signals are applied at IN through a resistance 5 shunted by a diode 6, sensed as shown, to the base of the transistor 3 the collector of which supplied video signals to the open end of the line 1. Video signals are also applied from IN through a second diode 7, sensed as shown, in series with a resistance 8 to the base of the transistor 4 the collector of which supplied video signals to the end of the line terminated by the resistance 2. A tap 9 on a potentiometer comprising resistances 10 and 11 connected as shown is connected to one end of the series circuit portion comprising the elements 7 and 8 the other end of this circuit portion being connected to the input terminal IN. Output is taken off at the output terminal OUT.

To understand the operation of this embodiment ignore for the moment the two diodes 6 and 7 and the two associated resistances 5 and 8 support two fractions $a$ and $b$ of a video signal voltage $V_{IN}$ to be applied simultaneously to the bases of the transistors 3 and 4, so that the input voltage to 3 is a $V_{IN}$ and that to 4 is $b\ V_{IN}$. Then the output voltage ($V_o$) at OUT across resistances 2 (of value $R_0$) will be made up of:

1. a voltage a $CV_{IN}R_o$ due to a current $i_1$ from transistor 3 and flowing along the line to $R_o$ and delayed by a time $T$ due to the line $G$ is the gain of transistor 3 and equals that of transistor 4.
2. a voltage $\frac{1}{2}b\ GV_{IN}R_o$ due to half of the current $i_2$ from transistor 4 and flowing, undelayed, in resistance 2.
3. a voltage $\frac{1}{2}b\ GV_{IN}R_o$ other half of the current $i_2$ which flows to the reflective end of the delay line, is reflected back therefrom and is therefore delayed by a time $2T$.

Figure 2:
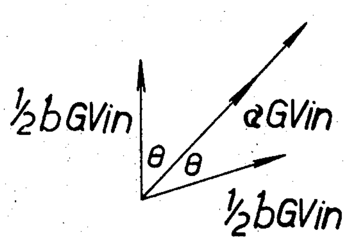
FIG. 2 is an explanatory vector diagram.

The resultant combination of these components to produce $V_o$ is shown by FIG. 2. The resultant current in resistance 2 ($R_o$) is $GV_{IN}(a+b\cos\theta)$ where $\theta = wT$ and $w = 2\pi f$, $f$ being the frequency. As will be seen, because the two vectors $\frac{1}{2}b\ GV_{IN}$ make equal and opposite angles with the vector a $GV_{IN}$ the output voltage is in phase with the component $aGV_{IN}$ at all frequencies and all values of $a$ and $b$. The output voltage magnitude $V_o$ is given by $$V_o = GV_{IN}R_o\,(a+\cos\theta) = GV_{IN}R_o\,(a+b\cos wt)$$

Figure 3:
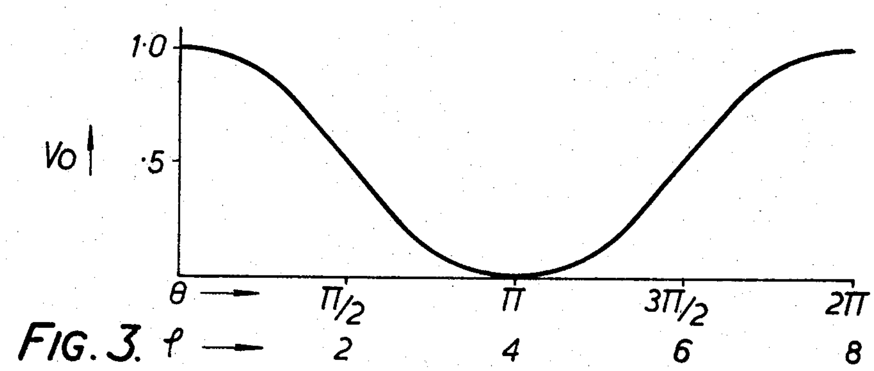
FIG. 3 is an explanatory graphical figure.

Condition A. If $a = b = \frac{1}{2}$ the output voltage is $GV_{IN}R_o$ *at DC. When* $wT = \frac{1}{2}\pi$ i.e. $\cos WT = 0$ the output voltage is $\frac{1}{2}\ GV_{IN}R_0$. When $wT=\pi$ i.e. $\cos WT=-1$ the output is zero. FIG. 3 graphically illustrates this condition. In practice the portion of FIG. 3 to the right of $\theta = \pi$ and $f = 0$ is ignored because the overall bandwidth employed in the television system of which the camera forms part excludes the said portion, cutting off at (about) where $\theta=\pi$ and $f=0$.

Condition B. If $a = 1$ and $b = 0$ the output voltage is $GV_{IN}R_o$ *at all frequencies*.

Accordingly, the required level-dependent bandwidth control can be achieved by making the circuit change from condition $A$ to condition $B$ at some chosen signal level. This is achieved in the embodiment of FIG. 1 by means of the circuits including the diodes 6 and 7. At low signal levels diode 6 is biassed to cut off, diode 7 conducts and the circuit operates in condition $A$. When the signal level increases to a chosen value 6 conducts and 7 cuts off, and the circuit operates in condition $B$. The point at which the circuit changes from one operating condition to the other can be adjusted by adjusting the DC level of the input at IN.

I claim:

1. A circuit for receiving video signals from a television camera tube comprising a delay line which is reflective at one end and nonreflective at its other end, a first signal level dependent means for cutting off signals below a predetermined level, a second signal level dependent means for cutting off signals above a predetermined level, means for applying signals through said first signal level dependent means to said reflective end of the delay line, means for applying signals through said second signal level dependent means to said nonreflective end of the delay line, and means for taking off video signals from the delay line.

2. A circuit as claimed in claim 1 wherein said first signal level dependent means comprise a resistance shunted by a diode sensed and biassed to cut off low level signals, and said second signal level dependent means comprise a second resistance in series with a second diode sensed and biassed to cut off high signal levels.

3. A circuit as claimed in claim 2 further comprising a first transistor having its input means coupled to the first said resistance shunted by the first said diode, the first transistor having its output means coupled to the reflective end of said delay line; and a second transistor having its input means coupled to a circuit comprising the series connected second resistance and second diode, the second transistor having its output means coupled to the nonreflective end of said delay line.

4. A circuit as claimed in claim 1 wherein said other end of the delay line is terminated by an impedance equal to the characteristic impedance.

5. A circuit as claimed in claim 2 wherein said other end of the delay line is terminated by an impedance equal to the characteristic impedance.

6. A circuit as claimed in claim 3 wherein said other end of the delay line is terminated by an impedance equal to the characteristic impedance.

7. A circuit as claimed in claim 4 wherein said means for taking delay video signals from the delay line is connected to said other end of the delay line.

8. A circuit as claimed in claim 5 wherein said means for taking off video signals from the delay line is connected to said other end of the delay line.

9. A circuit as claimed in claim 6 wherein said means for taking off video signals from the delay line is connected to said other end of the delay line.